United States Patent [19]

Anderson

[11] 4,305,470
[45] Dec. 15, 1981

[54] POWER HOE WITH RECIPROCATING CUTTING HEAD

[76] Inventor: Elbert J. Anderson, 1315 N. Fourth East, Bountiful, Utah 84010

[21] Appl. No.: 86,566

[22] Filed: Oct. 19, 1979

[51] Int. Cl.$^3$ .............................................. A01B 1/08
[52] U.S. Cl. ..................................................... 172/41
[58] Field of Search ................... 172/41, 42, 43, 84, 172/376, 377; 74/44; 30/216, 220

[56] References Cited

U.S. PATENT DOCUMENTS

| 2,550,522 | 4/1951 | Bolongaro | 172/42 X |
|---|---|---|---|
| 2,553,463 | 5/1951 | McCulloch | 172/41 X |
| 3,031,018 | 4/1962 | Smithers | 172/41 |
| 3,935,905 | 2/1976 | Chery | 172/41 X |
| 3,965,991 | 6/1976 | Eads et al. | 172/376 |
| 4,003,436 | 1/1977 | Foster et al. | 172/41 |
| 4,049,059 | 9/1977 | Weibling | 172/43 X |
| 4,093,031 | 6/1978 | Portz | 172/372 |
| 4,122,902 | 10/1978 | Alexander | 172/41 |
| 4,148,363 | 4/1979 | van der Lely | 172/47 |

FOREIGN PATENT DOCUMENTS

| 1042934 | 11/1958 | Fed. Rep. of Germany | 172/42 |
|---|---|---|---|
| 1800229 | 5/1970 | Fed. Rep. of Germany | 172/41 |
| 2628927 | 1/1977 | Fed. Rep. of Germany | 172/42 |
| 1178303 | 12/1958 | France | 172/41 |
| 620235 | 3/1949 | United Kingdom | 172/43 |
| 133690 | 3/1961 | U.S.S.R. | 172/42 |

*Primary Examiner*—Richard T. Stouffer
*Attorney, Agent, or Firm*—H. Ross Workman; Rick D. Nydegger; Drew S. Hamilton

[57] ABSTRACT

A power hoe for working soil. The power hoe includes a drive shaft contained inside a housing and driven by an electric hand drill. A drive pin mounted to a drive plate at the end of the drive shaft is inserted into a piston housed in a sleeve. The piston is allowed to slide back and forth within the sleeve thus allowing the rotational motion of the drive pin to be translated to harmonic reciprocating motion at the sleeve in a direction perpendicular to the path of the moving piston. The sleeve is attached to a cutting head, thus causing the cutting head also to reciprocate. The cutting head can be adjusted so as to change the length of the stroke; the speed of the stroke varies with the speed of the hand drill. A curved cutting edge on the blade of the cutting head compensates for the arc of the blade as it reciprocates, allowing for more efficient working of the soil.

13 Claims, 6 Drawing Figures

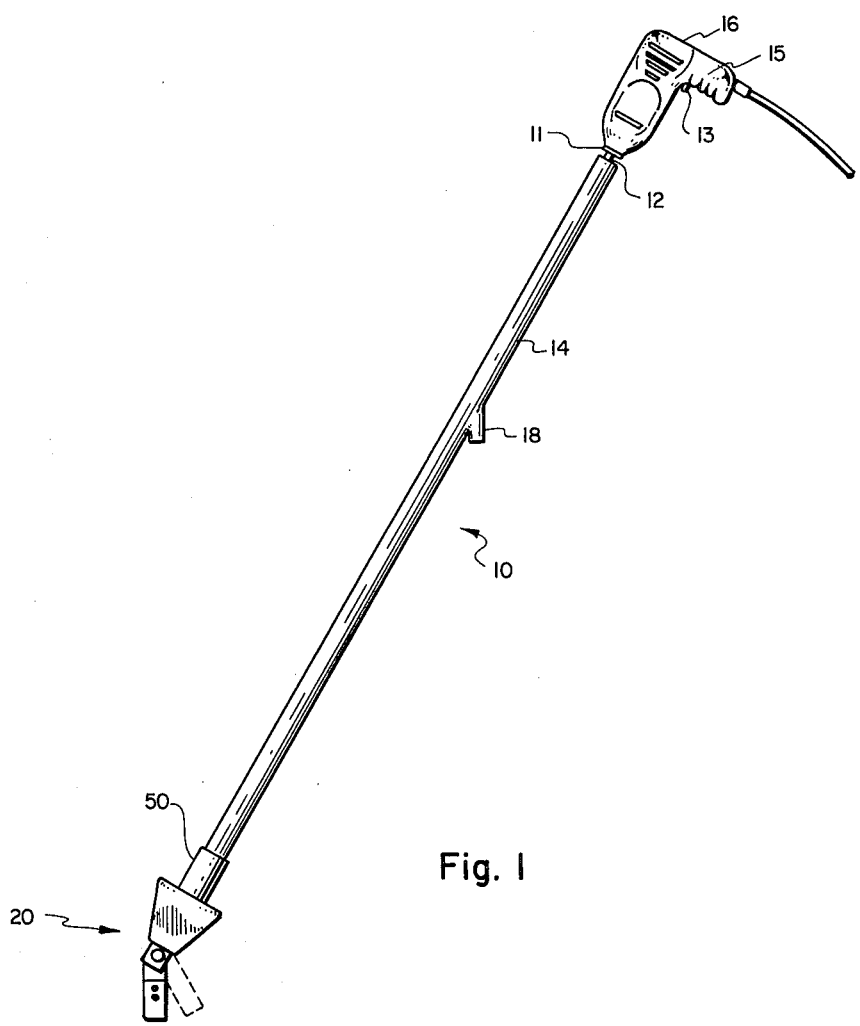
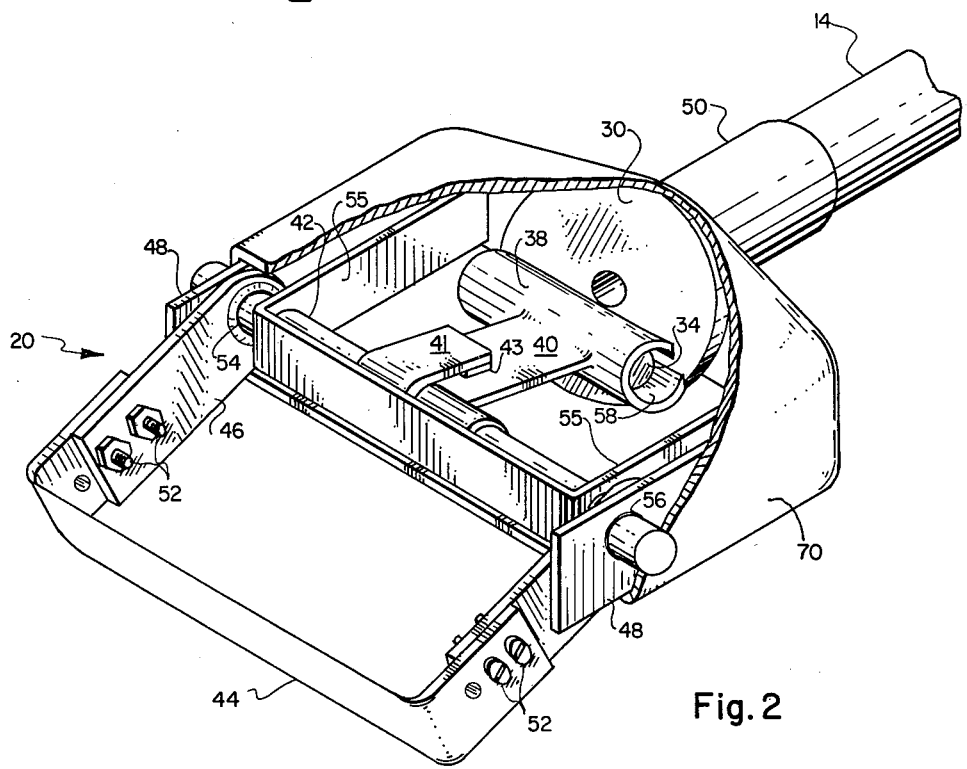

POWER HOE WITH RECIPROCATING CUTTING HEAD

BACKGROUND

1. Field of the Invention

The present invention relates to earth-working implements and more particularly to a hand-held, power-driven hoe for soil cultivation.

2. The Prior Art

Power-driven earth-working implements have long been used in the art of soil cultivation. Typically, these implements comprise fixed rotating working tools mounted to a frame. (See U.S. Pat. Nos. 3,031,018, 4,003,436, and 4,148,363.) While these implements do work the soil, they are often inefficient and limited to only a few applications. The rotary motion of the working tools tends to work the tools deeper into the earth, and the operator must continually push and struggle to maintain a constant progression of the implement. Often, the tools are poorly shaped for efficient soil penetration. Also, the tool blades are generally of fixed length and speed, thus severely limiting the applications of the implement. Since no adjustment for length is provided, if the operator desires to work deeper into the soil, he simply slows his pushing and allows the implement to work itself deeper into the soil. This can be extremely awkward and difficult since the implement will be very difficult to push along at increased depths of soil.

From the foregoing, it will be appreciated that what is needed in the art is a power-driven earth working implement that utilizes a more progressive type of motion to work the earth more efficiently with properly shaped tools that can be easily adjusted in length and operated at various speeds to provide a wide range of applications. Such an invention is illustrated and described herein.

BRIEF DESCRIPTION AND OBJECTS OF THE INVENTION

The power implement of the present invention is a power hoe for soil cultivation.

The power hoe includes a drive shaft contained inside a housing and connected to a motor, such as an electric hand drill. The motor turns the drive shaft and causes a drive pin mounted to a drive plate at the end of the drive shaft to travel in a circular path. The drive pin is inserted into a piston housed in a sleeve. The piston slides back and forth inside the sleeve to absorb the component of motion of the drive pin in that direction. The sleeve thus assumes a harmonic reciprocating motion in the direction perpendicular to the path of the moving piston. The sleeve is attached to a cutting head, the cutting head thus reciprocating with the sleeve. The reciprocating motion of the cutting head allows for better progression of the implement as it works the soil. The length and speed of the stroke of the cutting head may be adjusted as needed. Preferably, the cutting blade of the cutting head is curved in order to compensate for the arc of the cutting head as it reciprocates, thereby allowing for more efficient working of the soil.

It is therefore a primary object of the present invention to provide an improved soil-working power hand tool for garden cultivation.

Another important object of the present invention is to provide an inexpensive power hand tool that can be operated by conveniently and simply connecting it to a conventional electric hand drill.

Yet another object of the present invention is to provide a more efficient power soil-working hand tool by curving the blade of the cutting head so as to compensate for the arc of the cutting head as it reciprocates, and by providing for adjustment of the stroke length and speed of the cutting head corresponding to the needed application.

A further object of the present invention is to provide a soil-working power hand tool with even weight distribution by placing the motor at the end of the handle so as to counter-balance the cutting head.

These and other objects of the present invention will become more fully apparent from the following description and appended claims taken in conjunction with the accompanying drawings.

BRIEF DESCRIPTION OF THE DRAWING

FIG. 1 is a side view of a preferred embodiment of the power hoe of the present invention.

FIG. 2 is an enlarged perspective illustration of the earth-working portion of the power hoe.

DETAILED DESCRIPTION OF THE PREFERRED EMBODIMENTS

Figure 3:
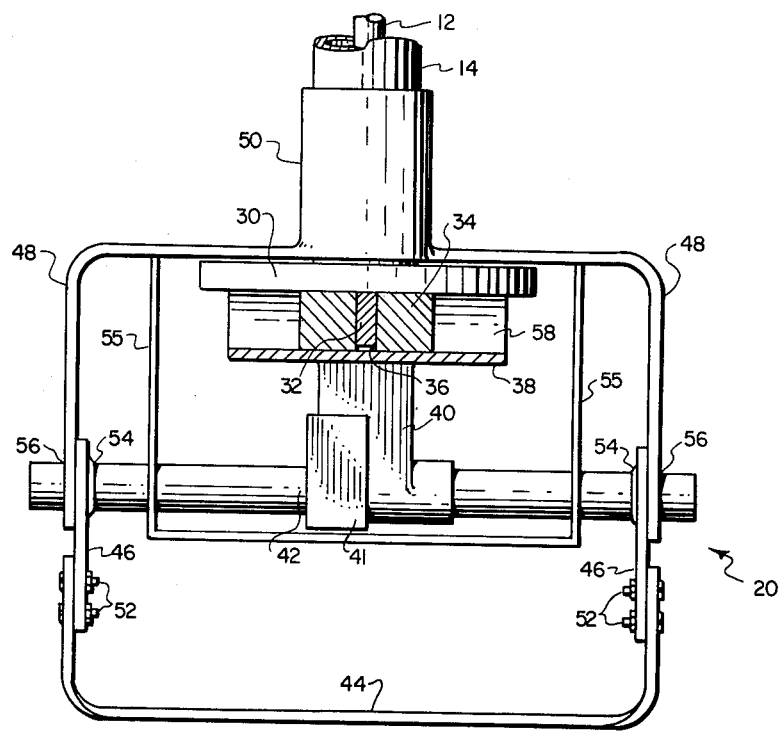
FIG. 3 is a top plan partial cross-sectional view of the embodiment of FIG. 2.

Reference is now made to the drawing wherein like parts are designated with like numerals throughout.

The power hoe of the present invention may be used for a variety of cultivating purposes in working the soil, for example, tilling and aerating the soil, cutting out weeds, or intermixing fertilizer or other composts with the soil. Referring to the figures, the power hoe generally designated 10 consists in part of a motor means 16 at the upper end of a housing 14 and a stirrup-shaped cutting head 20 at the lower end of the housing.

Contained within housing 14 is a drive shaft 12 which is connected to the motor means at the upper end of housing 14 such that the drive shaft is caused to rotate within the housing when hand drill 16 is operated by a power source. The motor means may be such that its speed may be varied; such variable speed capability will allow the changing of the speed of the stroke of cutting head 20 as needed.

As illustrated in FIG. 1, the motor means is preferably a conventional power hand drill. Making the present invention adaptable for use with such a commonly available power hand drill eliminates the expense of providing a separate motor. Nevertheless, it will be appreciated that any motor means, which may be either electrically or gas operated and which may or may not be permanently affixed to the drive shaft, capable of rotating the drive shaft is within the present invention.

A hand hold 18 may be mounted to housing 14 to provide for easy manipulation of the power hoe; the operator may grip hand hold 18 with one hand and the handle of hand drill 16 with the other. Also, the length of housing 14 may be varied to provide long or shorthandled models as desired. It is desirable to mount the hand drill at the upper end of the housing so as to counter-balance the weight of cutting head 20, thus providing a power hoe with even weight distribution which is easier to manipulate.

Cutting head 20 reciprocates in harmonic motion following the path illustrated in FIG. 1. This motion provides efficient working of the soil with each stroke and better progression of the power hoe as it works the soil. The method of translating the motion of rotating drive shaft 12 to reciprocating motion at cutting head 20 will be explained later in detail.

Figure 5:
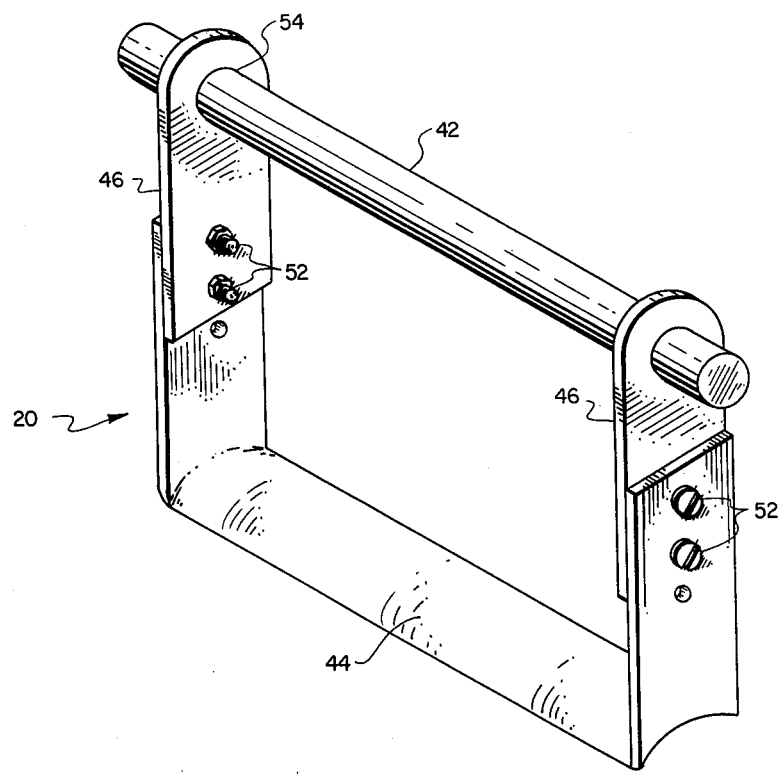
FIG. 5 is a perspective view of the cutting head of the power hoe shown in FIGS. 2 and 3.

As is illustrated in FIGS. 2, 3, and 5, cutting head 20 consists of a U-shaped blade 44 securely attached to two blade members 46 by bolts 52. A support rod 42 extends through a hole in each of the blade members at 54 and is fixedly attached to blade members 46 at 54. The blade 44 is preferably curved, that is, the blade has an arcuate cross-sectional configuration to compensate for the arc of the cutting head 20 as it reciprocates. This blade configuration more effectively penetrates and works the soil than if a flat blade were used.

By adjusting bolts 52, blade 44 can be adjusted with respect to blade members 46, thereby increasing or decreasing the length of the cutting head. This may be accomplished by placing a series of holes at the ends of blade 44 and blade members 46, moving blade 44 along blade members 46 to a desired length, and then slipping the bolts through the overlapping holes at 52 and tightening the nuts. Alternatively, it will be appreciated that this length-adjusting feature can be accomplished by a variety of other methods, such as sliding a bolt along a slot in each end of blade 44 and tightening a nut to the end thereof through a hole in blade member 46. Adjustment of the length of the cutting head increases or decreases the stroke of the cutting head, thereby increasing or decreasing the amount of soil which is worked in each stroke.

The combined features of the curved blade 44, and the ability to change the speed and length of reciprocating cutting head 20 yield a power hoe that can be applied to a variety of uses.

Figure 6:
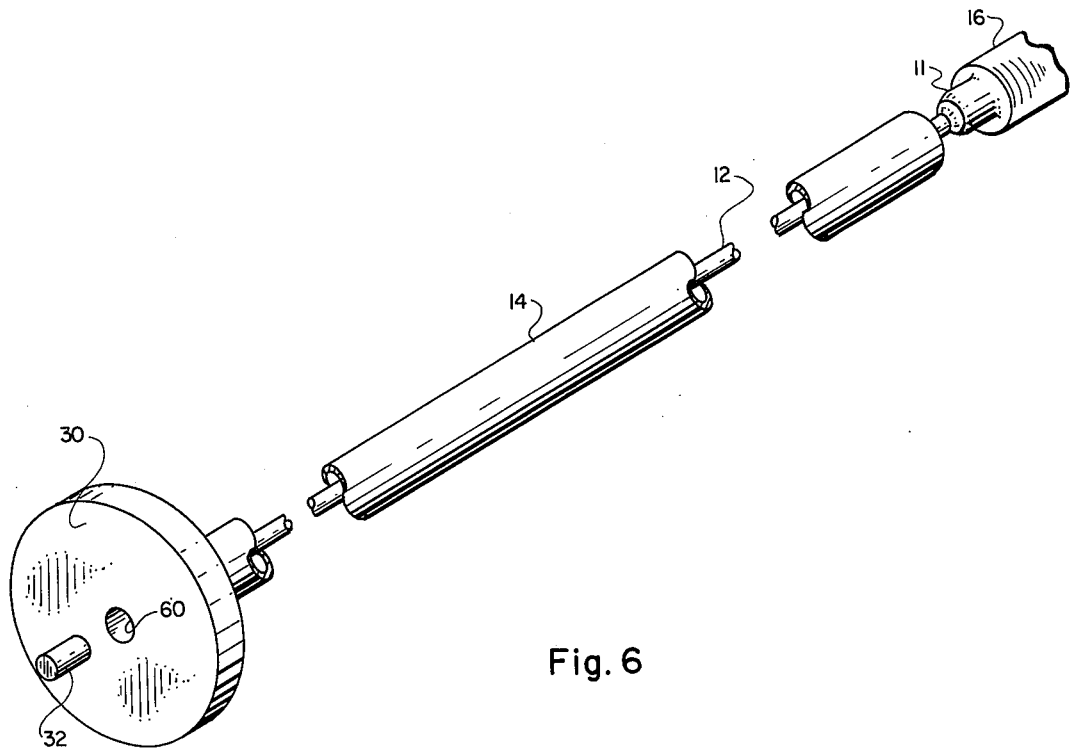
FIG. 6 is a sectional perspective illustration of the housed drive shaft, drive plate, and drive pin assembly of the power hoe.

Referring now to FIG. 6, drive shaft 12 is attached to a drive plate 30 at 60 near the lower end of the housing. Drive plate 30 is preferably disc-shaped. A peg-shaped drive pin 32 is mounted to drive plate 30. Accordingly, the drive pin assumes a circular path of motion when the drive plate is rotated by the drive shaft. The drive pin is inserted into the bore 36 of a piston 34 as is best shown in FIG. 3. This piston is housed in a generally trough-shaped sleeve 38 which is cylindrical and hollow but open along one face. The open face of sleeve 38 faces drive plate 30 and bore 36 of piston 34 is exposed through this open face so as to permit insertion of the drive pin therein. Hence, the piston slides freely within sleeve 38 from end to end of its hollow interior 58 as directed by rotating drive pin 32. Alternatively, it may be appreciated that the drive pin may directly cooperate with the hollow interior of sleeve 38 and slide freely from end to end of the sleeve. Although piston 34 is not necessary, it is preferred so as to minimize wear of the drive pin and the sleeve. Metal connecting member 40 is welded to sleeve 38 at one end and to support rod 42 at the other so as to provide a fixed assembly consisting of sleeve 38, connecting member 40, support rod 42, and cutting head 20.

Figure 4:
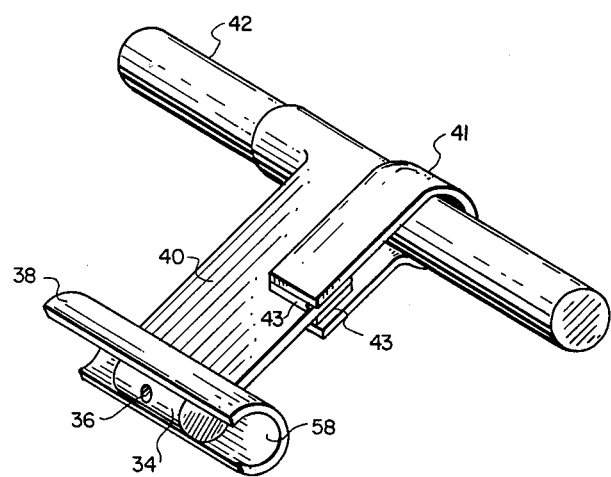
FIG. 4 is a perspective view of the sleeve, piston, connecting member, and support rod assembly of the power hoe shown in FIGS. 2 and 3.

As shown in FIGS. 2 and 4, a U-shaped jaw 41 is fixedly attached to support rod 42. This jaw functions as a shock absorber to reduce the shock-induced energy which is communicated along the drive shaft and the housing resulting from the working of the soil. In the preferred embodiment, pads 43, which are made of rubber or other resilient material, are interposed between the inside faces of the jaw and connecting member 40. With this configuration, by simply changing the resiliency of the pads, by either varying the type, size, or shape of the rubber pads, and the length of the U-shaped jaw, the desired amount of shock absorption necessary can be obtained. Such shock absorption is highly desirable to minimize wear on all moving parts, as well as minimizing the possibility of breakage when the cutting head makes contact with a rock or other hard object in the soil.

Two forks 48 are fixedly attached to an annular ring 50 at the lower end of housing 14. Each end of support rod 42 projects through a hole 56 at the end of each fork 48 without being welded or fixedly attached to forks 48. In this way, support rod 42 can rotate freely through the holes 56 in forks 48. Forks 48 thus provide support for the cutting head while permitting the cutting head to reciprocate with respect to housing 14.

As can be seen in FIGS. 2 and 3, baffles 55 are mounted to support rod 42 and forks 48 and cooperate with the dust cover 70 to protect the piston-in-sleeve assembly from dust and other foreign matter. The dust cover surrounds the forks and the moving elements at the working end of the power hoe, except for blade members 46 and blade 44. The edges of baffles 55 are flush with the surface of dust cover 70 so as to completely encapsulate the piston-in-sleeve assembly.

It is preferable that all of the parts of the present invention be made of metal or other hard material which is sufficiently strong and durable to withstand the forces, vibrations, and shocks exerted upon the power hoe as it works the soil. Even with an all-metal construction, the power hoe of the present invention can be made relatively light in weight so that it can be easily manipulated while working the soil.

The manner of operating the power hoe will be readily apparent to those of ordinary skill in the art. The operator grips hand hold 18 with one hand and the handle 15 of hand drill 16 with the other.

As shown in FIG. 6, drive shaft 12 is inserted into the chuck 11 of hand drill 16 and is rotated at a speed determined by the pressure placed on the trigger 13 of the hand drill. Rotating drive shaft 12 in turn rotates drive plate 30 which is securely attached to drive shaft 12. Drive pin 32, being mounted directly to rotating drive plate 30, thus assumes a circular path of motion.

Referring to FIGS. 2 and 3, the drive pin is inserted into bore 36 of piston 34 which is housed in sleeve 38. Piston 34 slides back and forth from one end of the hollow interior 58 of sleeve 38 to the other, as directed by drive pin 32. In this way, piston 34 absorbs the component of motion of drive pin 32 in the direction of moving piston 34. The component of motion of drive pin 32 perpendicular to the path of moving piston 34 is imparted to sleeve 38 which houses piston 34. Sleeve 38 thus assumes a reciprocating harmonic motion in the direction perpendicular to the path of moving piston 34 as directed by rotating drive pin 32 and sliding piston 34.

Sleeve 38 is attached to cutting head 20 at support rod 42 by connecting member 40, thus forming a fixed assembly. This fixed assembly reciprocates with sleeve 38, and jaw 41, along with pads 43, acts as a shock absorber. Thus, the cutting head reciprocates with sleeve 38 as pivoted by support rod 42. In this way, the motion of the rotating drive shaft as powered by the hand drill is translated to reciprocating harmonic motion at the cutting head.

From the foregoing, it will be appreciated that the power hoe of the present invention advantageously provides an improved power hand tool operated by a simple electric hand drill which allows for efficient working of the soil by use of a stirrup-shaped cutting head with a curved cutting blade and an easily adjustable stroke length and speed, preferably utilizing a piston-in-sleeve method of translating the rotational motion of the hand drill to the reciprocating motion of the cutting head.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A power implement comprising:
 a drive shaft within a housing;
 means for connecting a motor to the drive shaft so as to provide rotational motion thereof;
 a drive plate attached to said drive shaft and rotated thereby;
 an end of a drive pin mounted to said drive plate and the other end housed in a sleeve;
 a cutting head mounted to the sleeve such that the sleeve and the drive pin work in harmony so as to translate the rotational motion of the drive shaft to a reciprocating motion at the cutting head;
 a support rod connected to said sleeve for supporting the cutting head, wherein said support rod is joined to said sleeve by a connecting member;
 forks mounted at the end of said housing and attached to said support rod so as to support said cutting head while allowing said cutting head to reciprocate with respect to said housing; and
 baffles adjacent to said sleeve and said piston and a dust cover surrounding said forks, said sleeve, and said piston so as to protect against the entrance of dust and foreign matter therein.

2. A power implement as defined in claim 1 wherein said other end of the drive pin is inserted into a piston which is housed in the sleeve, such that the piston, the sleeve, and the drive pin work in harmony so as to translate the rotational motion of the drive shaft to a reciprocating motion of the cutting head.

3. A power implement as defined in claim 1 wherein the length of said cutting head can be increased or decreased.

4. A power implement as defined in claim 1 wherein the cutting head is curved.

5. A power implement as defined in claim 1 and further including a motor connected by said connecting means to said drive shaft wherein the motor can be adjusted so as to increase or decrease the speed of said rotating drive shaft.

6. A power implement as defined in claim 1 wherein said housing has a hand hold mounted thereon.

7. A power implement comprising:
 a drive shaft within a housing;
 means for connecting an electric hand drill to the upper end of the drive shaft so as to provide rotational motion of the drive shaft;
 a drive plate attached to the lower end of the drive shaft and rotated thereby near the lower end of the housing;
 a drive pin mounted to the drive plate, said drive pin moving in a circular path with respect to the center of the drive plate;
 a piston which is solid except for a bore extending diametrically through the center of said piston into which said drive pin is inserted;
 a sleeve which is configurated as a U-shaped trough and forms a longitudinal section of a hollow cylinder so as to provide a housing for said piston, and allows the piston to slide freely from one end of the hollow sleeve to the other as directed by the drive pin, thereby translating the rotational motion of the drive pin to reciprocating harmonic motion of the sleeve in a direction perpendicular to the path of the moving piston;
 a cutting head mounted to the sleeve, said cutting head having a U-shaped blade which has an arcuate cross-sectional configuration to compensate for arc as the blade reciprocates, said cutting head further having two blade members, one blade member attached to each end of the blade so as to be adjustable and permit the length of said blade to be increased or decreased and thereby yield a longer or shorter stroke of the blade, and said cutting head further having a cylindrical support rod extending through the blade members and firmly attached thereto so as to support the cutting head;
 a connecting member firmly attached to the sleeve at one end thereof and the support rod at the other so as to provide a fixed assembly with the sleeve and the cutting head, said cutting head thus reciprocating with the motion of said sleeve;
 forks mounted at their upper ends to an annular ring in the lower end of said housing, said forks having holes in their lower ends such that each end of said support rod projects through the hole of one of the forks so as not to be attached, thereby allowing free rotation of said support rod through the holes and permitting the cutting head to reciprocate with respect to the housing while the forks support the cutting head;
 a U-shaped jaw attached to the support rod of said cutting head, said jaw having resilient material interposed between said jaw and said connecting member;
 baffles connected to the support rod and the forks; and
 a dust cover surrounding the forks, the piston, and the sleeve, said dust cover cooperating with said baffles to protect against the entrance of dust and foreign matter therein.

8. A power implement comprising:
 a drive shaft within a housing;
 means for connecting a motor to the drive shaft so as to provide rotational motion thereof;
 a drive plate attached to said drive shaft and rotated thereby;
 an end of a drive pin mounted to said drive plate and the other end housed in a sleeve;
 a cutting head mounted to the sleeve such that the sleeve and the drive pin work in harmony so as to translate the rotational motion of the drive shaft to a reciprocating motion at the cutting head;

a support rod connected to said sleeve for supporting the cutting head, wherein said support rod is joined to said sleeve by a connecting member; and shock absorber means attached to the cutting head so as to reduce communication of shock-induced energy along the drive shaft and the housing;

said shock absorber means comprising a U-shaped jaw surrounding the support arm and the connecting member, and at least one resilient pad interposed between said U-shaped jaw and the connecting member.

9. A power implement as defined in claim 8, wherein said other end of the drive pin is inserted into a piston which is housed in the sleeve, such that the piston, the sleeve, and the drive pin work in harmony so as to translate the rotational motion of the drive shaft to a reciprocating motion of the cutting head.

10. A power implement as defined in claim 8 wherein the length of said cutting head can be increased or decreased.

11. A power implement as defined in claim 8 wherein the cutting head is curved.

12. A power implement as defined in claim 8 and further including a motor connected by said connecting means to said drive shaft wherein the motor can be adjusted so as to increase or decrease the speed of said rotating drive shaft.

13. A power implement as defined in claim 8 wherein said housing has a hand hold mounted thereon.

* * * * *